Feb. 8, 1927.
N. A. CHRISTENSEN
1,616,571
BRAKE CONTROL VALVE MECHANISM
Filed July 19, 1926
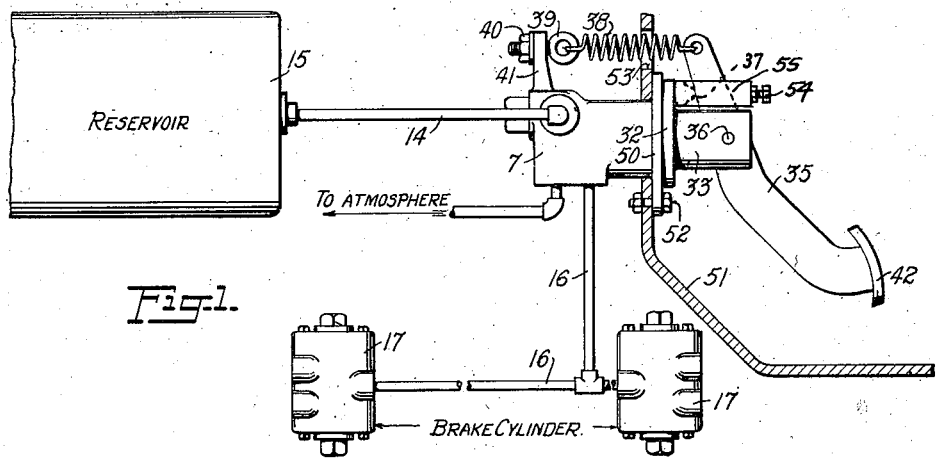
Fig. 1.
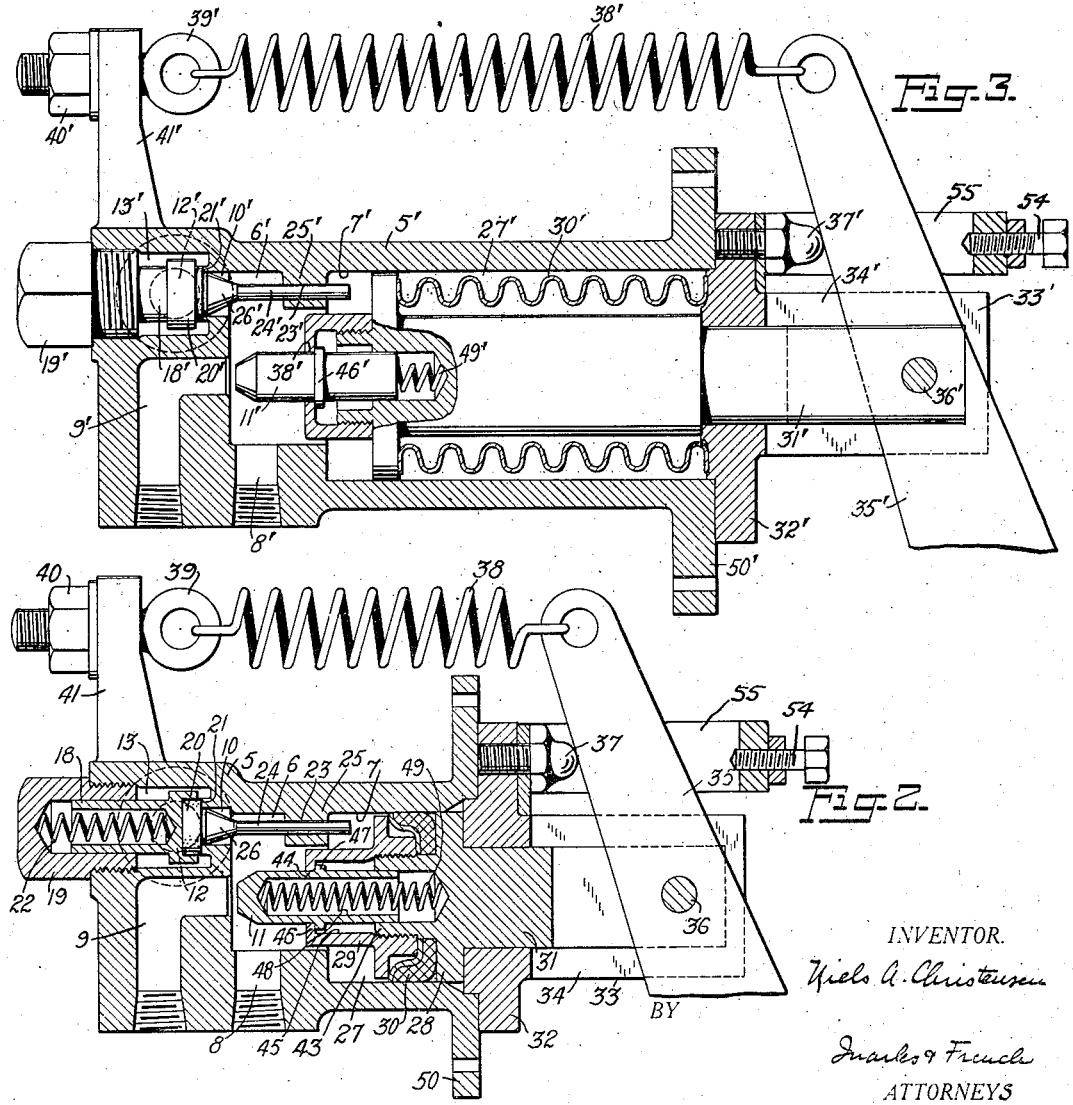
Fig. 3.
Fig. 2.
INVENTOR.
Niels A. Christensen
BY Marks & French
ATTORNEYS Patented Feb. 8, 1927.

1,616,571

UNITED STATES PATENT OFFICE.

NIELS A. CHRISTENSEN, OF CLEVELAND, OHIO.

BRAKE-CONTROL-VALVE MECHANISM.

Application filed July 19, 1926. Serial No. 123,570.

The invention relates to brake control valves, more particularly adapted for use in connection with the fluid-pressure-operated brakes of automotive vehicles and trailers for such vehicles.

The object of this invention is to provide an improved control valve mechanism in which the braking pressure of the system may be readily controlled by the operator of the vehicle so that said pressure may be readily varied by the operator to secure the desired brake application pressure, the control being more particularly designed for foot operation. More specifically the object of the invention is to provide improvements over the type of control valve shown in my copending application, Serial No. 23,847, filed April 17, 1925.

The invention further consists in the several features hereinafter described and more particularly pointed out in the appended claims.

In the drawings, Fig. 1 is an elevation view of brake-control-valve mechanism embodying the invention, showing it applied to an automotive vehicle;

Fig. 2 is a vertical sectional view of the valve mechanism embodying the invention;

Fig. 3 is a view similar to Fig. 2 showing a modified form of parts of the mechanism.

Referring to Figs. 1 and 2, the numeral 5 designates a valve casing having a space 6 formed therein, including a bore 7. A passage 8, a valve-controlled exhaust passage 9 and a valve-controlled inlet passage 10 communicate with the space 6. A relief valve 11 controls the flow of air or other pressure fluid from the space 6 to the passage 9 and thence in a compressed air system to atmosphere, and an inlet valve 12 controls the flow of compressed air or pressure fluid from a chamber 13 connected by a pipe 14 with the reservoir 15. The passage 8 is connected by any suitable piping 16 to the brake cylinders 17 associated with the wheels of the vehicle.

The inlet valve has a tubular portion 18 slidably mounted in the bore of a box-nut 19 having threaded engagement with the casing, and has a head 20 of composition material inset therein and held against the seat 21 by a spring 22 mounted in the bore of the portion 18 and interposed between the end of said bore and the outer end of the bore in the nut 19.

A push-pin 23 is slidably mounted in the passage 10 and has a stem portion 24 mounted in a bore in a lug 25 of the casing. The head 26 of this pin engages the head 20 of the inlet valve 12 and is tapered so as to gradually increase the effective port opening as it is pushed inwardly by the operating means.

A piston 27, formed of parts 28 and 29 and the flexible packing 30, works in the bore 7 and has a rod portion 31 slidably mounted in guide and cover plate 32 secured to the casing. The outer end of this rod 31 works in a tubular extension 33 of the plate 32 which has a vertically disposed slot 34 therein in which the operating lever 35 works. This lever 35 is secured intermediate its ends to the rod 31 by a pin 36 and is normally held at one side of its pivot against a fulcrum provided by the rounded head of a screw 37 by means of a tension spring 38 secured at one end to the upper end of the lever 35 and adjustably connected at its other end by an eyebolt 39 and nut 40 to a lug 41 on the casing. The spring 38 is always under some tension and hence exerts a constant pressure tending to move the lever and the piston associated therewith outwardly and in opposition to the force applied by the operator to the pedal portion 42 of said lever. The part 29 has threaded engagement with a threaded tubular end portion 43 of the part 28 whereby the medial portion of the packing disk 30 is clamped between said parts, and bores 44 and 45 alined with the bore in end portion 43, the bore 44 being of smaller diameter than the bore 45 to form a stop flange 46.

The relief valve 11 is in the form of a poppet needle type valve having the conical head adapted to seat on the inner end of the passage 9 and having a tubular stem with a flange 47 and a bore 48. A spring 49 is mounted in the bore 48 and interposed between the end of said bore and the inner end of the bore in end portion 43, and said spring normally acts to move the valve 11 so that its flange 47 abuts against the flange 46. Thus the valve 11 is moved by and with the piston 27 through the pressure of the spring 49 and the piston 27 may also move relative to said valve when it seats. The valve 11 is not responsive to the air pressure in the space 6 to effect its opening, but its change in position is due directly to the position and movement of the piston 27.

The casing is provided with a flange 50 for convenient mounting on the dash 51 of the vehicle by clamping bolts 52 and the spring 38 works through a hole 53 in the dash.

The modification shown in Fig. 2 is generally similar except for the type of piston or pressure-responsive member and the parts 11' to 26' are the same in construction and operate the same as parts 5 to 26 previously described. The piston 27' consists of the parts 28' and 29' and a multiple diaphragm 30' secured at one end in a fluid-tight manner, as by soldering, to the flange on the inner side of the part 29' and at its other end in a similar manner to the cover plate 32'.

The relief valve 11 is mounted in the part 29', which is similar to the part 29, and is acted upon by a spring 38' and has a flange 47', cooperating with a stop-flange 46'. The piston 27 has a rod portion 31' and the parts 32' to 49', inclusive, are similar to parts 32 to 49, inclusive, previously described.

With the above construction, when the operator presses down on the pedal portion of the lever 35 or 35' the piston 27 or 27' is moved inwardly, thereby increasing the tension of the spring 38, and the first effect of this movement causes the exhaust valve 11 or 11' to be moved to its seat to close off the exhaust passage 9 or 9'. Further inward movement puts pressure upon the valve 11 or 11' through the compression of the spring 49 or 49' and then causes the piston to engage the pin 24 or 24' and move it to open the inlet valve 12 or 12', whereupon the compressed air from the reservoir flows from the pipe 14, chamber 13 or 13', passage 10 or 10' to the space 6 or 6' and thence through the passage 8 or 8' and pipes 16 to the brake cylinders 17. As the pressure in the brake system builds up, the pressure in the space 6 or 6' in front of the piston 27 or 27' increases until it overcomes the pressure being exerted by the operator through the spring 38 whereupon the piston travels away from the stem 24 or 24', due to the change of the fulcrum from screw 37 to the pedal portion of the lever and the inlet valve closes and the parts are then in a "lap" position, since the piston travel is then not sufficient to relieve the pressure on the spring 38 to such an extent as to permit unseating of the valve 11 or 11', which, it will be noted, has a greater tendency to remain seated because of the differential areas of the seat and the valve. Thereafter release of the increased tension on the spring 38 by the release of pressure on the pedal will cause the piston 27 or 27' to travel outward, due to the pressure exerted upon it by the compressed fluid in the space 6 or 6' and to the initial tension of the spring 38 so that finally the piston moves to the position shown in the drawing wherein the relief valve is open, with a consequent exhaust of air from the brake system, or if further pressure is desired a further increase of tension in the spring 38 by a greater movement of the pedal lever by the operator will cause the piston 27 or 27' to move from the "lap" position heretofore noted to again engage the pin 24 or 24' and cause the inlet valve 12 or 12' to be again opened to admit more air from the reservoir while the relief valve remains closed.

Thus, the more the operator presses down upon the brake pedal 35 or 35' the greater is the force stored up in the spring 38 and the greater the air pressure in the space 6 or 6' has to be to overcome this force to bring the valves to a "lap" position so that the extent of braking pressure in the system is dependent upon the degree of movement of the lever 35 or 35' which is under the control of the operator, who can thus regulate and control the amount of braking pressure he desires. Furthermore, the "lap" position is obtained through the shifting of the fulcrum point between the screw 37 and the foot of the operator since each of these points has a lost motion association with the pedal which permits the piston to be moved either by the operator or by the compressed air within the valve mechanism against the tension of the spring 38.

In case the spring 38 should break or get out of order, I have provided a limiting stop-screw 54 mounted on a yoke 55 secured to the cover plate in any suitable manner, as by the screw 37', so as to limit the outward movement of the piston and permit operation of the valve without the compensating action until repairs can be made.

Of course, it will be understood that the pin 24 or 24' may be formed integral with the valve 12 or 12'.

I desire it to be understood that this invention is not to be limited to any particular form or arrangement of parts except in so far as such limitations are specified in the claims.

What I claim as my invention is:

1. In brake control mechanism, the combination of a casing communicating with the brake system and having inlet and exhaust ports, an inlet valve controlling the passage of motive fluid through said inlet port to said casing and brake system, an exhaust valve controlling the release of fluid from said casing and brake system through said exhaust port, a piston working in said casing for opening said inlet valve and responsive to the pressure in said casing, said exhaust valve being carried by and having a yieldable connection with said piston whereby the piston moves independently of said exhaust valve to open said inlet valve or to permit its closing when said exhaust valve is closed, an operating lever pivotally connected to said piston, a spring connected to said lever, and an abutment for said lever upon which and from which said lever is free to shift under the varying tensions of said spring incident to the operator's pressure upon said lever and the pressure in the brake system.

2. In brake control valve mechanism, the combination of a casing communicating with the brake system and having inlet and exhaust ports, a piston working in said casing, a spring-closed inlet valve for said inlet port opened by the piston, a spring-pressed exhaust valve for said exhaust port carried and closed by the piston, an operating lever pivotally connected to said piston and having a pedal portion, a spring associated with said piston and lever, and a fulcrum member for said lever on the opposite side of said lever from said pedal portion, said lever adapted to fulcrum about said fulcrum member or about said pedal portion through a change in pressure in the brake system.

3. In a vehicle control valve, the combination of a casing communicating with the brake system and having inlet ports, an inlet valve for said inlet port, a piston working in said casing for opening said inlet valve, a spring-pressed exhaust valve carried by the piston and movable relative thereto to permit said piston to open said inlet valve or move to a lap position when said exhaust valve is closed, said piston being moved in an outward direction by fluid-pressure in said casing, spring means for resisting the entire movement of said piston by said pressure and for moving it in the opposite direction, a foot pedal pivoted to said piston and associated with said spring means and under the control of the operator for varying the pressure of said spring, and a fulcrum for said lever against which it abuts when the pressure exerted upon said lever by the operator exceeds the pressure in the brake system and from which said lever is free to move when the brake pressure exceeds the operator's pressure upon said lever.

4. In a vehicle control valve, the combination with a casing having inlet and exhaust ports, inlet and exhaust valves therefor, a valve-operating member carrying and having movement relative to said exhaust valve, a foot pedal pivotally associated with said member and having a shiftable fulcrum, and a spring resisting movement of said member by the pressure in said brake system and of said pedal by the operator.

5. In a vehicle control valve, the combination with a casing having inlet and exhaust ports, poppet inlet and exhaust valves for said ports, a pressure-responsive member adapted to open said inlet valve and upon which said exhaust valve is carried and with respect to which it has relative movement and including a multiple bellows diaphragm whereby said member is movable to a "lap" position while exerting a closing pressure upon said exhaust valve, said member being responsive to changes in pressure in the brake system, and operator-controlled means for actuating said member.

In testimony whereof, I affix my signature.

NIELS A. CHRISTENSEN.